(12) United States Patent
Torikoshi

(10) Patent No.: US 8,675,241 B2
(45) Date of Patent: Mar. 18, 2014

(54) METHOD FOR PRINTING OVERSIZED IMAGE DATA

(75) Inventor: Keiko Torikoshi, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1487 days.

(21) Appl. No.: 12/122,692

(22) Filed: May 17, 2008

(65) Prior Publication Data

US 2009/0284795 A1    Nov. 19, 2009

(51) Int. Cl.
*G06K 15/00*    (2006.01)
*G06K 15/02*    (2006.01)
*H04N 1/387*    (2006.01)
*H04N 1/04*    (2006.01)

(52) U.S. Cl.
USPC ............ 358/1.18; 358/1.2; 358/450; 358/474

(58) Field of Classification Search
None
See application file for complete search history.

(56) References Cited

U.S. PATENT DOCUMENTS

| 5,461,707 A * | 10/1995 | O'Gorman | 345/668 |
| 2002/0033958 A1 * | 3/2002 | Sakamoto et al. | 358/1.12 |
| 2006/0119902 A1 * | 6/2006 | Ahmed et al. | 358/474 |
| 2006/0228044 A1 * | 10/2006 | Yeh et al. | 382/276 |
| 2008/0095470 A1 * | 4/2008 | Chao et al. | 382/298 |
| 2009/0051977 A1 * | 2/2009 | Moody | 358/450 |

FOREIGN PATENT DOCUMENTS

JP    1993-221076 A    8/1993

* cited by examiner

*Primary Examiner* — Thomas Lett
(74) *Attorney, Agent, or Firm* — Chen Yoshimura LLP

(57) ABSTRACT

A method implemented in a printer controller for printing oversized image data is described. During printing, a process is executed to determine whether the data to be printed have a page data size that exceeds the maximum printable area for the specified recording medium. The page data size of a given page is the total extent (width and height) of the data objects on the page. If the page data size exceeds the maximum printable area, the process determines whether the portions of the image that exceeds the maximum printable area are background data. If they are, a portion of the background data that exceeds the maximum printable area are cut off, and the document is printed without reducing the size of the non-background data. The method can also be implemented on a print driver.

8 Claims, 3 Drawing Sheets

METHOD FOR PRINTING OVERSIZED IMAGE DATA

BACKGROUND OF THE INVENTION

1. Field of the Invention

This invention relates to image processing and printing methods, and in particular, it relates to a method of printing oversized images.

2. Description of Related Art

When printing a document using a printer and a recording medium of a designated size (i.e. letter-sized paper), occasionally the data area of a page (i.e. the area of the page where data exist, excluding any white margin) will exceed the maximum printable area on the medium. For many printers, the maximum printable area is smaller than the size of the recording medium on which the document is to be printed. For example, many printers cannot print in a 0.2-inch margin at the edge of the paper, because such a margin is needed for the paper handling mechanism of the printer to handle the paper during printing. Thus, if the data area of a page extends to the full extent of the intended recording medium, it will exceed the maximum printable area.

There are several ways to handle a situation where the data area of a page exceeds the maximum printable area. One method is to reduce the size of the page image proportionally so that it fits within the maximum printable area. However, image size reduction may be unsatisfactory for users who wish to keep the accurate original size of the image in the printed document. Another method is to shift the image so that the left and top edges of the image are within the printable area, and cut off the data at the right side and/or bottom of the page that is outside of the maximum printable area. This method may cause the lost of important data. Yet another method is to allow the user to manually determine whether to reduce the image size or to print the image without size reduction.

SUMMARY

The present invention relates to a printing method for printing oversized images, i.e., image of a page where the data area exceeds the maximum printable area on the medium.

An object of the present invention is to provide a printing method that prints oversized image data without reducing the size of the images.

Another object of the invention is to provide a method for automatically determining whether to print oversized data with size reduction or without size reduction.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a printing method for printing a page of document on a recording medium, which includes: (a) receiving print data, the print data comprising a plurality of data objects constituting the page; (b) determining whether a data area of the page exceeds a maximum printable area on the recording medium; (c) if the data area exceeds the maximum printable area, determining whether data objects that exceed the maximum printable area are background data or non-background data; (d) if the data objects that exceed the maximum printable area are background data, cutting off portions of the data objects that exceed the maximum printable area; and (e) printing the print data.

In another aspect, the present invention provides a printer which includes: an I/O section for receiving print data from a host; a printer controller for parsing and interpreting the print data and for rasterizing the print data to generate raster image data; an image processing section for processing the raster image data; and a print engine for forming images on a recording medium according to the processed raster image data, wherein the printer controller is programmed to perform a process including: (a) storing the print data, the print data comprising a plurality of data objects constituting a page; (b) determining whether a data area of the page exceeds a maximum printable area on the recording medium; (c) if the data area exceeds the maximum printable area, determining whether data objects that exceed the maximum printable area are background data or non-background data; and (d) if the data objects that exceed the maximum printable area are background data, cutting off portions of the data objects that exceed the maximum printable area.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
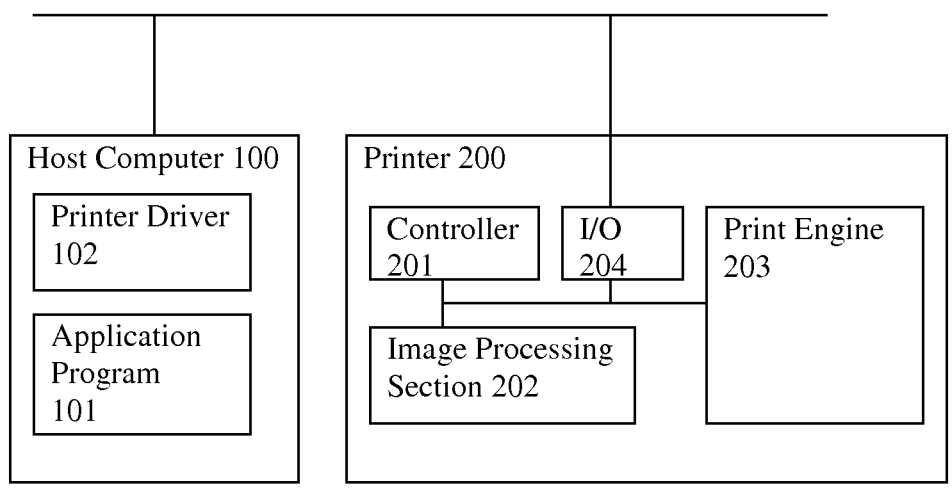
FIG. 1 illustrates a data processing system in which a printing method according to embodiments of the present invention may be implemented.

FIG. 1 illustrates a data processing system including a host computer 100 and a printer 200 in which methods according to embodiments of the present invention may be implemented. The host computer 100 and the printer 200 are connected to each other via a network or a dedicated connection. The host computer 100 includes, among other things, an application program 101 and a printer driver program 102. The application program 101 invokes the printer driver 102; the printer driver performs certain processing functions and communicates with the printer 200. The printer 200 includes, among other things, a printer controller 201, an image processing section 202, a print engine 203, and an I/O section 204. The printer controller 201, which typically includes a central processing unit (CPU), a random access memory (RAM) and a read only memory (ROM), performs various control functions for the printer 200. The printer controller 201 also performs the functions of parsing and interpreting the data received from the host computer, rasterizing the data to generate raster image data, etc. The image processing section 202 performs image processing on the raster image data. The print engine 203, which for instance employs the electrophotographic process, forms an image on a recording medium based on the image data from the image processing section 202. The I/O section 204 accepts print data from the host computer.

According to embodiments of the present invention, during printing, a process is executed to determine whether the data to be printed have a data area whose size exceeds the maximum printable area of the recording medium. The data area of a given page is the area of the page where data exist, and excludes any white margins. If the size of data area exceeds the maximum printable area, the process determines whether the portions of the data that exceeds the maximum printable area are background data. If they are, a portion of the background data that exceeds the maximum printable area are cut off, and the page is printed without reducing the size of the non-background data.

As used in this disclosure, "background data" refers to data that carries no substantive information of the document. Examples of background data include watermarks, decorative borders, data forming a "design template" in a Microsoft® PowerPoint® document, etc. Various rules can be implemented to determine what data is background data; some examples are given in this disclosure, but other examples are also possible. The general principle for formulating such rules is that, for a particular data object, if a small portion of the data object can be cut off at the edge without losing substantive information, then the data object can be treated as background data. The specific rules may depend on the original application that created the document, the format of the data, etc.

The process described above may be performed by the controller of the printer, or by the printer driver program on the host computer. In preferred embodiments described below, the process is performed by the printer controller.

Figure 2:
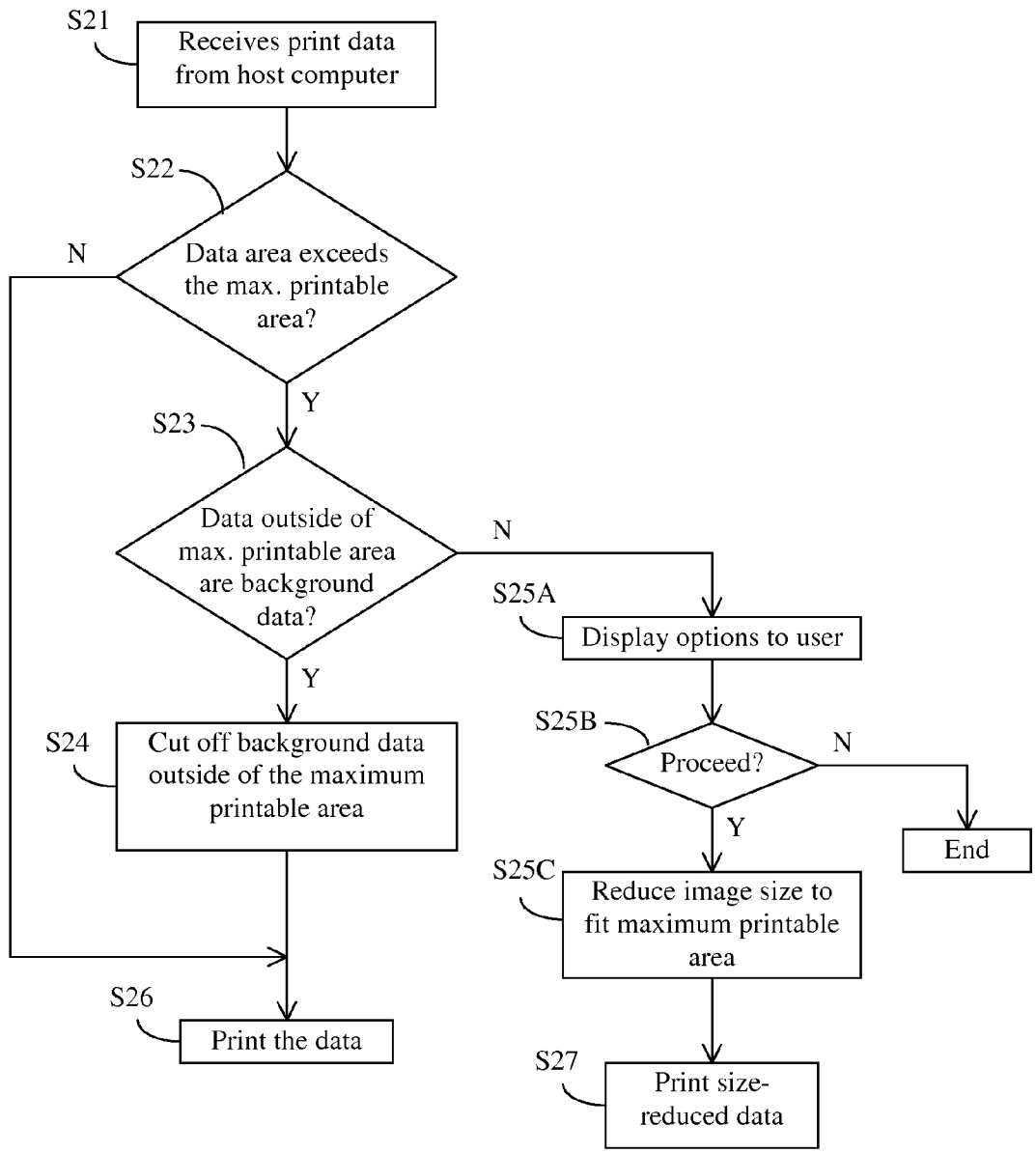
FIG. 2 illustrates a printing method according to an embodiment of the present invention.

FIG. 2 illustrates a general process flow of a printing method according to an embodiment of the present invention. A program on the host computer invokes the printer driver program to print a document. The printer controller receives the print data from the printer driver on the host computer (step S21). The print data is typically in a PDL (page description language) format, such as PostScript, PDF (Portable Document Format), or any other suitable format. A PDL typically describes the print data as a collection of data objects, where each data object may be a graphics object, a text object, or a bitmap image object. The printer controller determines whether the data area of a page exceeds the maximum printable area (step S22). For example, the horizontal size of the data area may be calculated as the difference between the start position of the left-most object and the end position of the right-most object on the page. The vertical size of the data are may be similarly calculated. The data area will exceed the maximum printable area if the horizontal or vertical size of the data area is greater than the horizontal or vertical size of the maximum printable area. If the data area exceeds the maximum printable area ("Y" in step S22), the printer controller determines whether the data objects that exceed the maximum printable area are background data (step S23). If they are ("Y" in step S23), the portion of the background data outside of the maximum printable area is cut off (step S24), and the resulting data is printed (step S26).

As described earlier, various rules may be implemented in step S23 to determine whether a data object is background data or non-background data. For example, if the print data contains multiple layers of objects, the bottom layer may be deemed background data. In another example, if the print data originates from a PowerPoint® document, the "design template" objects may be deemed background data. The design template data may be distinguished from other data, for example, because PowerPoint sends the design template data as first data before other data.

If in step S23 it is determined that the data objects that exceed the maximum printable area is non-background data ("N" in step S23), an option is displayed to the user to either print a reduced-size image or to stop (step S25A). If the user chooses to proceed ("Y" in step S25B), the size of the entire page (including all objects on the page) is reduced proportionally so that the data area no longer exceeds the maximum printable area (step S25C), and the size-reduced data is printed (step S27). If the user chooses not to proceed ("N" in step S25B), the process ends.

If in step S22 it is determined that the data area does not exceed the maximum printable area ("N" in step S22), then the page of document is printed without any change to the data (step S26). Note that the printing steps include all necessary steps for generating an image on the recording medium, including interpreting the data, rasterizing the data, etc.

Figure 3:
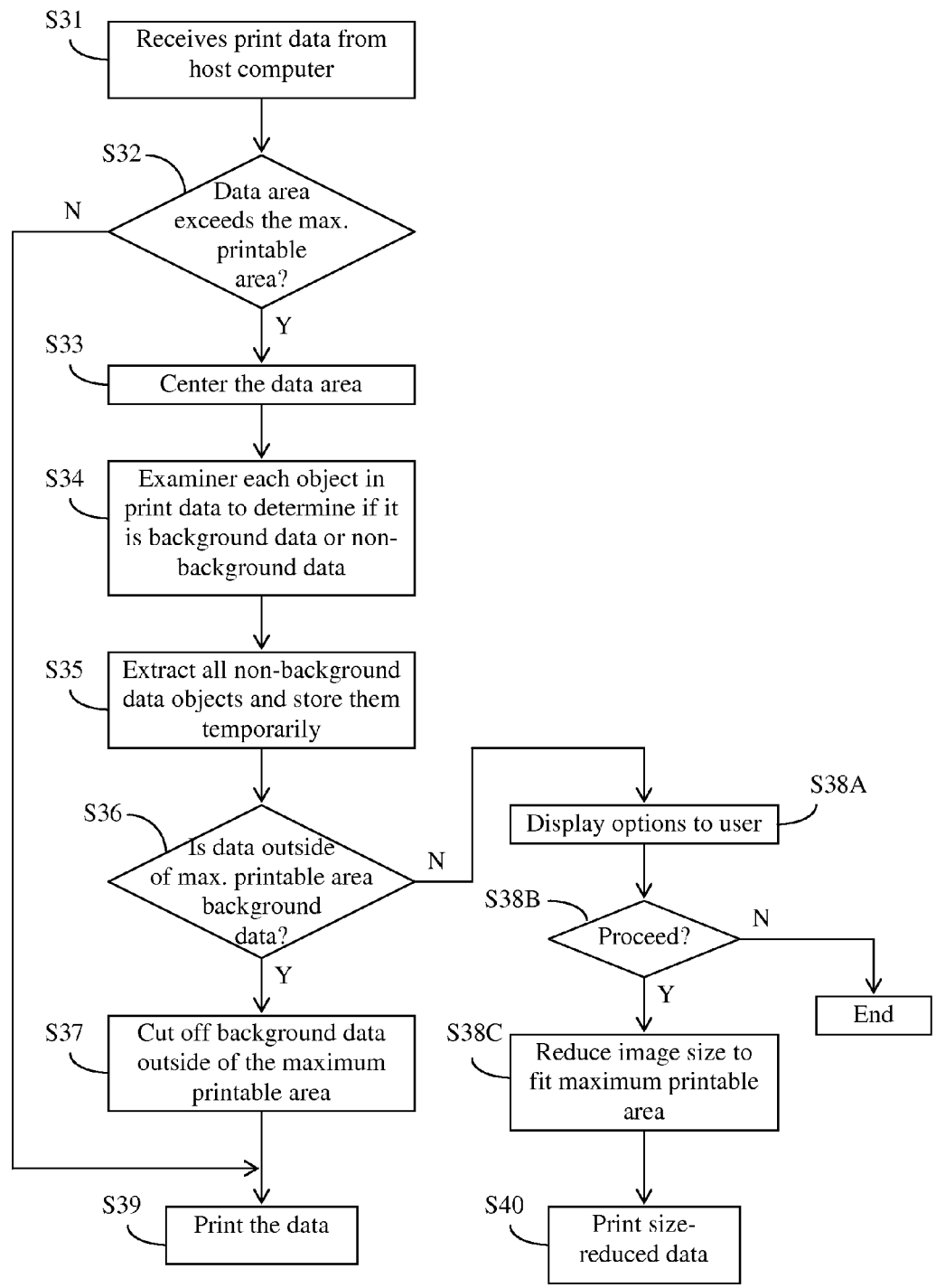
FIG. 3 further illustrates the printing method.

FIG. 3 is a more detailed flow chart illustrating the printing process of FIG. 2. After the printer controller receives the print data from the host computer (step S31), it is determined whether the data area of a page exceeds the maximum printable area (step S32). If it is not ("N" in step S32), the data is printed without additional processing (step S39). If it is ("Y" in step S32), the data objects constituting the page are shifted so that the data area is centered on the recording medium (step S33). The printer controller then examines each data object in the print data to determine whether it is background data or non-background data (step S34). All non-background data objects are extracted and stored temporarily (e.g. in the printer controller's RAM) (step S35).

Next, it is determined whether the data objects that exceed the maximum printable area are background data (step S36). If they are ("Y" in step S36), the background data outside of the maximum printable area is cut off (step S37). The background data is cut off at the left and right edges by equal amounts, and/or cut off at the top and bottom edges by equal amounts. More specifically, the starting point "a" of the background data (from the left edge) is calculated and compared to the starting point "b" of the maximum printable area. If a<b, an amount equal to the difference between b and a is cut off from the left edge of the background data. The same amount is cut off from the right edge of the background data since the data area has been centered. The same operation is carried out for the top and bottom edges. Then, the background data objects after the cutting process, together with the non-background data objects that have been temporarily stored, are printed on the recording medium (step S39). If the data objects that exceed the maximum printable area are non-background data ("N" in step S36), the user is presented with a choice to print a reduced size image or to stop, and the program proceeds accordingly (steps S38A-S38C, S40).

In the preferred embodiments, steps S22 to S25C in FIG. 2 and steps S32 to S38C in FIG. 3 are performed by the printer controller. Alternatively, these steps may be performed by the printer driver or the application program on the host computer. In the latter case, steps S21 and S31 would be omitted, and step S26 and S39 would be to transmit the data to a printer.

It will be apparent to those skilled in the art that various modification and variations can be made in the printing method and apparatus of the present invention without departing from the spirit or scope of the invention. Thus, it is intended that the present invention cover modifications and variations that come within the scope of the appended claims and their equivalents.

What is claimed is:
1. A method for printing print data including a plurality of data objects constituting a page of a document on a recording medium, comprising:
(a) determining whether a data area of the page exceeds a maximum printable area on the recording medium;

(b) if the data area exceeds the maximum printable area, determining whether data objects that exceed the maximum printable area are background data or non-background data;

wherein each of the data objects is a graphics, text or image object to be laid out in the page, and wherein the plurality of data objects are included in the print data in a page description language (PDL) format for printing the page; and (c) if the data objects that exceed the maximum printable area are background data, cutting off portions of the data objects that exceed the maximum printable area.

2. The method of claim 1, wherein in step (c) the data objects are cut off by equal amounts on a left and a right edge, and/or cut off by equal amounts on a top and a bottom edge.

3. The method of claim 2, wherein step (b) comprises:
(b1) shifting the data objects so that the data area is centered on the recording medium;
(b2) examining each data object to determine whether it is background data or non-background data; and
(b3) extracting all non-background data objects and temporarily storing them.

4. The method of claim 1, further comprising:
if it is determined in step (b) the data objects that exceed the maximum printable area are non-background data, reducing a size of the page proportionally so that the data area no longer exceeds the maximum printable area.

5. A printer comprising:
a printer controller for parsing and interpreting print data and for rasterizing the print data to generate raster image data, wherein the print data including a plurality of data objects constituting a page of a document on a recording medium;
an image processing section for processing the raster image data; and
a print engine for forming images on the recording medium according to the processed raster image data,
wherein the printer controller is programmed to perform a process comprising:
(a) determining whether a data area of the page exceeds a maximum printable area on the recording medium;
(b) if the data area exceeds the maximum printable area, determining whether data objects that exceed the maximum printable area are background data or non-background data;

wherein each of the data objects is a graphics, text or image object to be laid out in the page, and wherein the plurality of data objects are included in the print data in a page description language (PDL) format for printing the page; and (c) if the data objects that exceed the maximum printable area are background data, cutting off portions of the data objects that exceed the maximum printable area.

6. The printer of claim 5, wherein in step (c) the data objects are cut off by equal amounts on a left and a right edge, and/or cut off by equal amounts on a top and a bottom edge.

7. The printer of claim 6, wherein step (b) comprises:
(b1) shifting the data objects so that the data area is centered on the recording medium;
(b2) examining each data object to determine whether it is background data or non-background data; and
(b3) extracting all non-background data objects and temporarily storing them.

8. The printer of claim 5, wherein the process further comprises:
if it is determined in step (b) the data objects that exceed the maximum printable area are non-background data, reducing a size of the page proportionally so that the data area no longer exceeds the maximum printable area.

* * * * *